US012572460B2

(12) United States Patent
Neelannavar

(10) Patent No.: US 12,572,460 B2
(45) Date of Patent: Mar. 10, 2026

(54) COMPLETING A DEVICE OPERATION INITIATED IN A FIRST MODE IN A SECOND MODE IN A MULTI-PROTOCOL STORAGE DEVICE

(71) Applicant: SanDisk Technologies LLC, Austin, TX (US)

(72) Inventor: Savita Neelannavar, Bangalore (IN)

(73) Assignee: SanDisk Technologies LLC, Austin, TX (US)

( * ) Notice: Subject to any disclaimer, the term of this patent is extended or adjusted under 35 U.S.C. 154(b) by 0 days.

(21) Appl. No.: 18/668,484

(22) Filed: May 20, 2024

(65) Prior Publication Data

US 2025/0355797 A1      Nov. 20, 2025

(51) Int. Cl.
*G06F 12/02* (2006.01)

(52) U.S. Cl.
CPC ................................ *G06F 12/0246* (2013.01)

(58) Field of Classification Search
CPC .... G06F 3/0679; G06F 3/0652; G06F 3/0659;
G06F 3/064; G06F 12/0246; G06F
2221/2143; G06F 3/0619; G06F
2212/7201; G06F 3/0604; G06F 3/061;
G06F 21/79; G06F 2212/7205; G06F
3/0658; G06F 3/0688; G06F 13/1668;
G06F 2212/1016; G06F 3/0616; G06F
12/1433; G06F 3/0632; G06F 2212/7204;
G06F 3/0655; G06F 3/0622; G06F
3/0653; G06F 12/1009; G06F 13/161;
G06F 3/0623; G06F 3/0656; G06F
12/023; G06F 2212/7203; G06F
2212/7208; G06F 3/0611; G06F 3/0625;
G06F 3/0634; G06F 3/0644; G06F
3/0649; G06F 3/065; G06F 12/0207;
G06F 12/0238; G06F 12/0623; G06F
12/0646; G06F 12/10; G06F 12/1081;
G06F 12/109; G06F 12/14; G06F
13/1694; G06F 13/285; G06F 13/4234;
G06F 13/4278; G06F 13/4295; G06F
16/221; G06F 16/2255; G06F 21/62;
(Continued)

(56) References Cited

U.S. PATENT DOCUMENTS

| | | | | |
|---|---|---|---|---|
| 6,587,893 | B1 * | 7/2003 | Wickeraad | ............ G06F 13/122 |
| | | | | 710/5 |
| 6,611,907 | B1 * | 8/2003 | Maeda | ................ G06F 12/0223 |
| | | | | 711/170 |
| 9,069,972 | B2 | 6/2015 | Chen | |
| 10,403,369 | B2 | 9/2019 | Lin | |

(Continued)

*Primary Examiner* — Tasnima Matin
(74) *Attorney, Agent, or Firm* — Arlene Neal; NEAL BLIBO LLC

(57) ABSTRACT

A storage device may communicate with a host in multiple modes and physically erase data stored on a memory device in each mode. The storage device includes a memory device to store data. A controller on the storage device may receive a first command from the host to erase the data when the storage device communicates with the host in a first mode. The controller may execute the first command in the first mode and set an in-progress bit. The controller may determine when the storage device has switched to communicate with the host in a second mode and may determine that the in-progress bit is set. The controller may provide a first indication to the host, and in response to the first indication, receive a second command from the host. The controller may execute the second command in the second mode to erase the data in the second mode.

20 Claims, 6 Drawing Sheets

(58) Field of Classification Search
CPC ............. G06F 21/78; G06F 2206/1014; G06F 2212/1024; G06F 2212/1032; G06F 2212/1056; G06F 2212/65; G06F 2212/7202; G06F 2212/7211; G06F 3/06; G06F 3/0607; G06F 3/0608; G06F 3/0613; G06F 3/0614; G06F 3/062; G06F 3/0626; G06F 3/0628; G06F 3/0629; G06F 3/0638; G06F 3/0643; G06F 3/0647; G06F 3/0662; G06F 3/0683; G06F 3/0685; G11C 16/16; G11C 16/22; G11C 16/0483; G11C 16/14; G11C 16/10; G11C 16/102; G11C 16/105; G11C 11/5671; G11C 16/32; G11C 16/3495; G11C 16/24; G11C 16/26; G11C 16/349; G11C 16/08; G11C 16/3445; G11C 16/107; G11C 16/28; G11C 2207/2227; G11C 2216/24; G11C 7/109; G11C 8/12
See application file for complete search history.

(56) References Cited

U.S. PATENT DOCUMENTS

| | | | | |
|---|---|---|---|---|
| 11,294,579 | B2 | 4/2022 | Muthiah | |
| 2006/0059295 | A1* | 3/2006 | Suda | G11C 16/102 |
| | | | | 711/103 |
| 2009/0193180 | A1* | 7/2009 | Ito | G06F 13/385 |
| | | | | 711/E12.001 |
| 2011/0161530 | A1* | 6/2011 | Pietri | G06F 13/4022 |
| | | | | 710/14 |
| 2013/0332653 | A1* | 12/2013 | Yeh | G06F 12/0246 |
| | | | | 711/E12.008 |
| 2016/0034217 | A1 | 2/2016 | Kim | |
| 2021/0342097 | A1* | 11/2021 | Lin | G06F 3/06 |
| 2021/0397352 | A1* | 12/2021 | Muthiah | G06F 3/0679 |
| 2022/0083263 | A1* | 3/2022 | Grosz | G06F 3/0604 |
| 2023/0195333 | A1 | 6/2023 | Ji | |
| 2024/0295916 | A1* | 9/2024 | Duan | G06F 1/3275 |
| 2024/0380641 | A1* | 11/2024 | Pakrooh | G01S 7/006 |
| 2025/0117063 | A1* | 4/2025 | Fleming | H04N 23/70 |
| 2025/0199721 | A1* | 6/2025 | Kim | G06F 3/0659 |

* cited by examiner

100

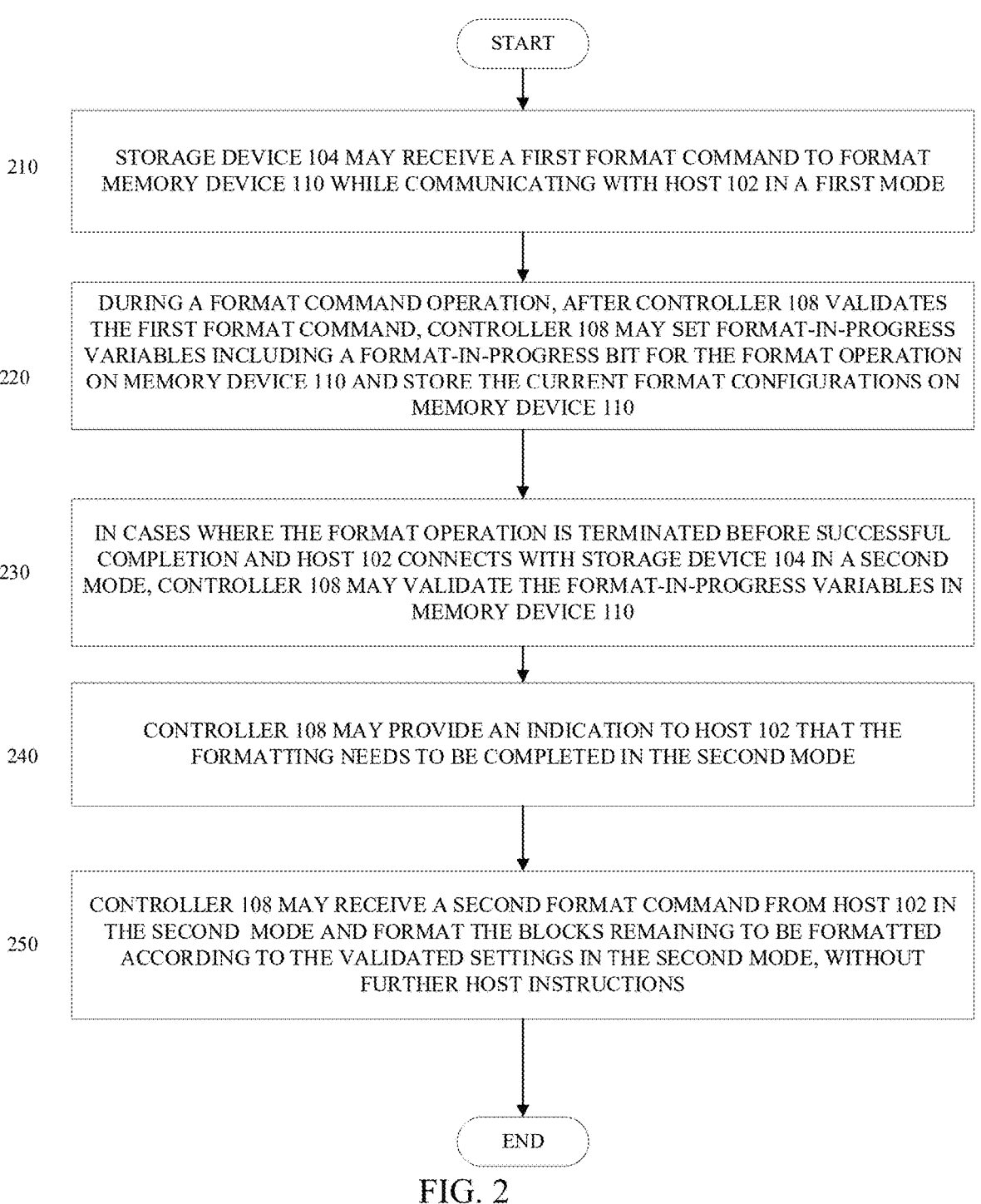

START

210    STORAGE DEVICE 104 MAY RECEIVE A FIRST FORMAT COMMAND TO FORMAT MEMORY DEVICE 110 WHILE COMMUNICATING WITH HOST 102 IN A FIRST MODE

220    DURING A FORMAT COMMAND OPERATION, AFTER CONTROLLER 108 VALIDATES THE FIRST FORMAT COMMAND, CONTROLLER 108 MAY SET FORMAT-IN-PROGRESS VARIABLES INCLUDING A FORMAT-IN-PROGRESS BIT FOR THE FORMAT OPERATION ON MEMORY DEVICE 110 AND STORE THE CURRENT FORMAT CONFIGURATIONS ON MEMORY DEVICE 110

230    IN CASES WHERE THE FORMAT OPERATION IS TERMINATED BEFORE SUCCESSFUL COMPLETION AND HOST 102 CONNECTS WITH STORAGE DEVICE 104 IN A SECOND MODE, CONTROLLER 108 MAY VALIDATE THE FORMAT-IN-PROGRESS VARIABLES IN MEMORY DEVICE 110

240    CONTROLLER 108 MAY PROVIDE AN INDICATION TO HOST 102 THAT THE FORMATTING NEEDS TO BE COMPLETED IN THE SECOND MODE

250    CONTROLLER 108 MAY RECEIVE A SECOND FORMAT COMMAND FROM HOST 102 IN THE SECOND MODE AND FORMAT THE BLOCKS REMAINING TO BE FORMATTED ACCORDING TO THE VALIDATED SETTINGS IN THE SECOND MODE, WITHOUT FURTHER HOST INSTRUCTIONS

END

FIG. 2

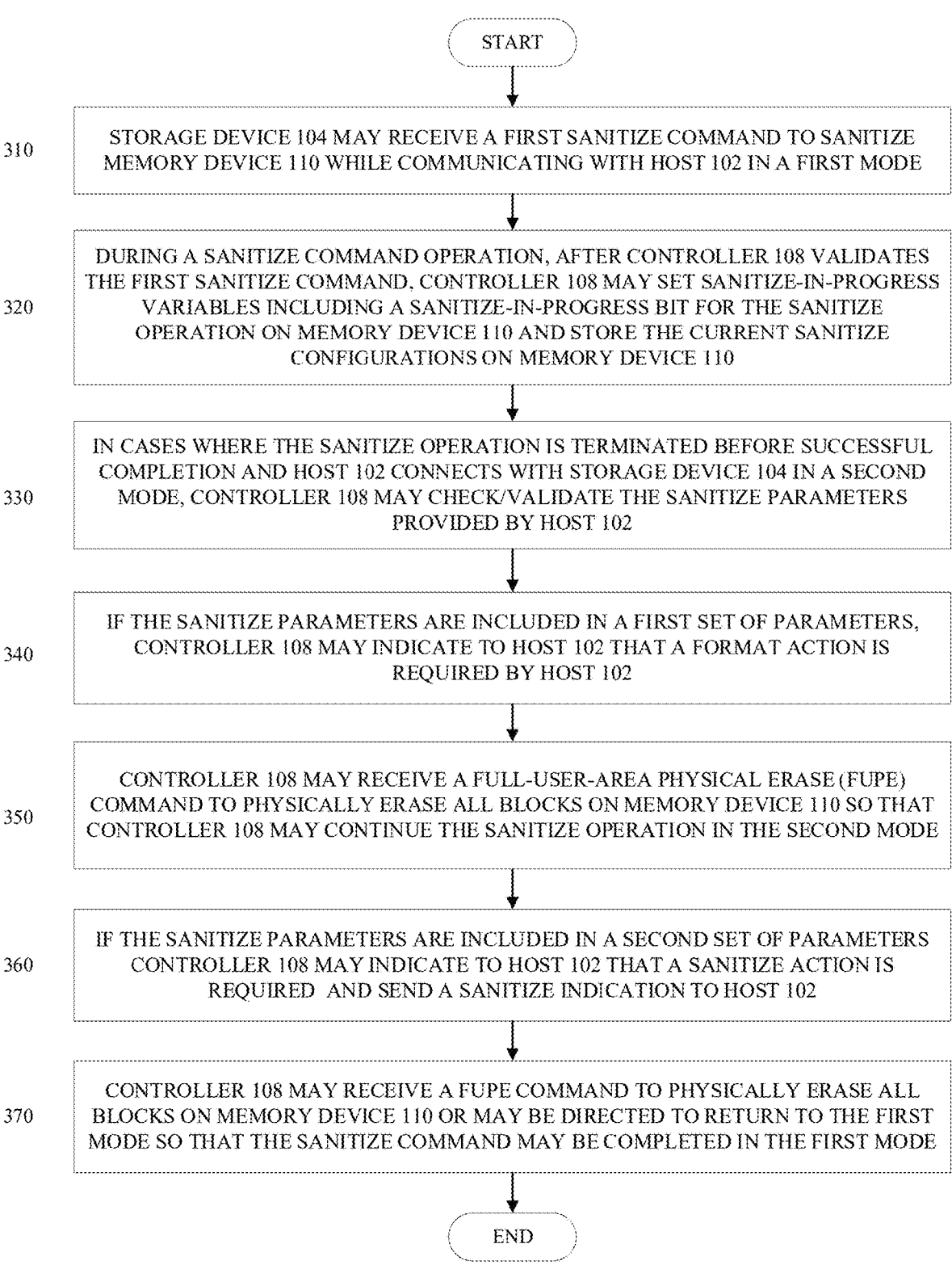

START

310  STORAGE DEVICE 104 MAY RECEIVE A FIRST SANITIZE COMMAND TO SANITIZE MEMORY DEVICE 110 WHILE COMMUNICATING WITH HOST 102 IN A FIRST MODE

320  DURING A SANITIZE COMMAND OPERATION, AFTER CONTROLLER 108 VALIDATES THE FIRST SANITIZE COMMAND, CONTROLLER 108 MAY SET SANITIZE-IN-PROGRESS VARIABLES INCLUDING A SANITIZE-IN-PROGRESS BIT FOR THE SANITIZE OPERATION ON MEMORY DEVICE 110 AND STORE THE CURRENT SANITIZE CONFIGURATIONS ON MEMORY DEVICE 110

330  IN CASES WHERE THE SANITIZE OPERATION IS TERMINATED BEFORE SUCCESSFUL COMPLETION AND HOST 102 CONNECTS WITH STORAGE DEVICE 104 IN A SECOND MODE, CONTROLLER 108 MAY CHECK/VALIDATE THE SANITIZE PARAMETERS PROVIDED BY HOST 102

340  IF THE SANITIZE PARAMETERS ARE INCLUDED IN A FIRST SET OF PARAMETERS, CONTROLLER 108 MAY INDICATE TO HOST 102 THAT A FORMAT ACTION IS REQUIRED BY HOST 102

350  CONTROLLER 108 MAY RECEIVE A FULL-USER-AREA PHYSICAL ERASE (FUPE) COMMAND TO PHYSICALLY ERASE ALL BLOCKS ON MEMORY DEVICE 110 SO THAT CONTROLLER 108 MAY CONTINUE THE SANITIZE OPERATION IN THE SECOND MODE

360  IF THE SANITIZE PARAMETERS ARE INCLUDED IN A SECOND SET OF PARAMETERS CONTROLLER 108 MAY INDICATE TO HOST 102 THAT A SANITIZE ACTION IS REQUIRED  AND SEND A SANITIZE INDICATION TO HOST 102

370  CONTROLLER 108 MAY RECEIVE A FUPE COMMAND TO PHYSICALLY ERASE ALL BLOCKS ON MEMORY DEVICE 110 OR MAY BE DIRECTED TO RETURN TO THE FIRST MODE SO THAT THE SANITIZE COMMAND MAY BE COMPLETED IN THE FIRST MODE

END

FIG. 3

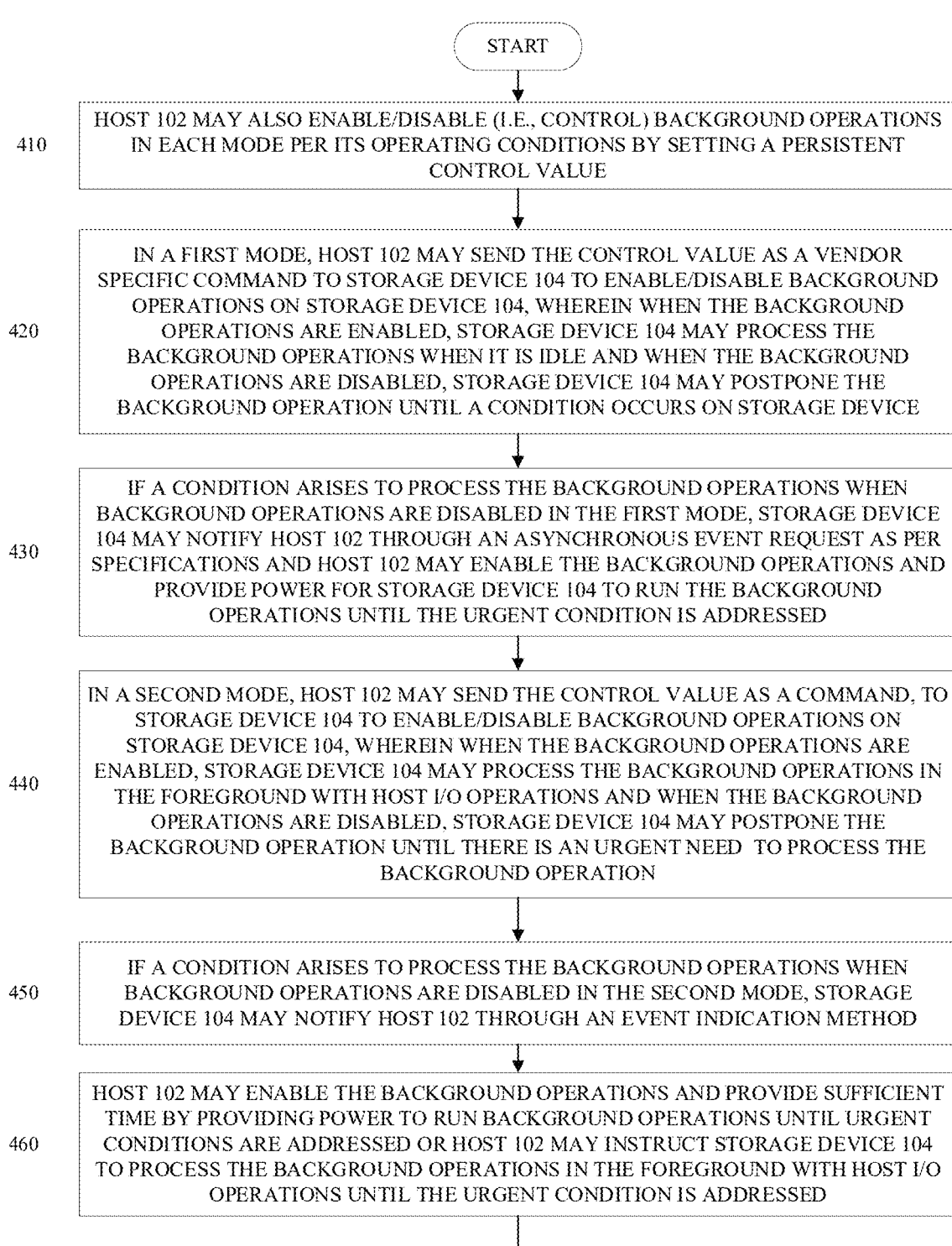

START

410    HOST 102 MAY ALSO ENABLE/DISABLE (I.E., CONTROL) BACKGROUND OPERATIONS IN EACH MODE PER ITS OPERATING CONDITIONS BY SETTING A PERSISTENT CONTROL VALUE

420    IN A FIRST MODE, HOST 102 MAY SEND THE CONTROL VALUE AS A VENDOR SPECIFIC COMMAND TO STORAGE DEVICE 104 TO ENABLE/DISABLE BACKGROUND OPERATIONS ON STORAGE DEVICE 104, WHEREIN WHEN THE BACKGROUND OPERATIONS ARE ENABLED, STORAGE DEVICE 104 MAY PROCESS THE BACKGROUND OPERATIONS WHEN IT IS IDLE AND WHEN THE BACKGROUND OPERATIONS ARE DISABLED, STORAGE DEVICE 104 MAY POSTPONE THE BACKGROUND OPERATION UNTIL A CONDITION OCCURS ON STORAGE DEVICE

430    IF A CONDITION ARISES TO PROCESS THE BACKGROUND OPERATIONS WHEN BACKGROUND OPERATIONS ARE DISABLED IN THE FIRST MODE, STORAGE DEVICE 104 MAY NOTIFY HOST 102 THROUGH AN ASYNCHRONOUS EVENT REQUEST AS PER SPECIFICATIONS AND HOST 102 MAY ENABLE THE BACKGROUND OPERATIONS AND PROVIDE POWER FOR STORAGE DEVICE 104 TO RUN THE BACKGROUND OPERATIONS UNTIL THE URGENT CONDITION IS ADDRESSED

440    IN A SECOND MODE, HOST 102 MAY SEND THE CONTROL VALUE AS A COMMAND, TO STORAGE DEVICE 104 TO ENABLE/DISABLE BACKGROUND OPERATIONS ON STORAGE DEVICE 104, WHEREIN WHEN THE BACKGROUND OPERATIONS ARE ENABLED, STORAGE DEVICE 104 MAY PROCESS THE BACKGROUND OPERATIONS IN THE FOREGROUND WITH HOST I/O OPERATIONS AND WHEN THE BACKGROUND OPERATIONS ARE DISABLED, STORAGE DEVICE 104 MAY POSTPONE THE BACKGROUND OPERATION UNTIL THERE IS AN URGENT NEED TO PROCESS THE BACKGROUND OPERATION

450    IF A CONDITION ARISES TO PROCESS THE BACKGROUND OPERATIONS WHEN BACKGROUND OPERATIONS ARE DISABLED IN THE SECOND MODE, STORAGE DEVICE 104 MAY NOTIFY HOST 102 THROUGH AN EVENT INDICATION METHOD

460    HOST 102 MAY ENABLE THE BACKGROUND OPERATIONS AND PROVIDE SUFFICIENT TIME BY PROVIDING POWER TO RUN BACKGROUND OPERATIONS UNTIL URGENT CONDITIONS ARE ADDRESSED OR HOST 102 MAY INSTRUCT STORAGE DEVICE 104 TO PROCESS THE BACKGROUND OPERATIONS IN THE FOREGROUND WITH HOST I/O OPERATIONS UNTIL THE URGENT CONDITION IS ADDRESSED

END

COMPLETING A DEVICE OPERATION INITIATED IN A FIRST MODE IN A SECOND MODE IN A MULTI-PROTOCOL STORAGE DEVICE

BACKGROUND OF THE INVENTION

A storage device may be communicatively coupled to a host and to non-volatile memory including, for example, a NAND flash memory device on which the storage device may store data received from the host. The storage device may operate in one or more modes. For example, the storage device may operate in a Non-Volatile Memory Express (NVMe) mode and in a secure digital (SD) mode. In the NVMe mode, a format operation may be carried out to erase data on the memory device and a sanitize operation may be carried out to permanently delete or destroy data on the memory device such that the data may not be recovered.

During the format or sanitize operation in the NVMe mode, after the storage device validates a format/sanitize command, a controller on the storage device may mark in-progress variable(s) for the format/sanitize operation on the memory device and store the current format/sanitize configurations. As a block is erased, the controller may keep track of the in-progress variables for the format/sanitize operation. For example, the controller may keep track of the number of blocks formatted, the number of blocks remaining to be formatted, and which block is currently being formatted. When the format/sanitize operation is successfully completed, the in-progress variables may be cleared on the memory device.

If the format or sanitize operation is terminated without being completed, some of the user data may be deleted from the memory device and some of the user data may be retained on the memory device. For example, if the storage device is powered off during the format or sanitize operation, some of the user data on the memory device may be deleted and some of the user data may be retained. In case a format or sanitize operation is terminated before completion, the values of the in-progress variables may continue to be stored on the memory device.

If the storage device switches from the NVMe mode to the SD mode after a format or sanitize operation is terminated before completion, the storage device may be initialized. Based on the values of the in-progress variables for the format/sanitize operation, the controller may determine that the format/sanitize operation did not successfully complete and may not allow input/output (I/O) commands as the storage device may not be in a properly formatted state, the logical-to-physical mappings may be corrupted, some blocks on the memory device may be erased, some blocks on the memory device may still have user data which may be cryptographically encrypted, and/or some blocks on the memory device may still have end-to-end protected user data in NVMe mode.

Although current SD specifications may allow logical erasing of the blocks such that logical-to-physical mappings may be invalidated, these SD protocols may not allow the blocks on the memory device to be physically formatted. So, to physically erase the user data in the memory device in the SD mode, one solution requires that the host returns to the NVMe mode, reruns the format/sanitize operation, and when the format/sanitize operation is successful, switch back to the SD mode.

In addition, the storage device may run non-optional background/maintenance operations in the NVMe mode during idle periods when the storage device is not performing I/O operations for the host. During these idle periods, the host may provide power to the storage device, causing the storage device to consume extra power when it is not performing host I/O operations. The background operations are enabled by default in the NVMe mode. In the SD mode, the storage device may run maintenance operations in the foreground (i.e., while it is performing host I/O operations) to conserve power. Background operations are disabled by default in the SD mode. If the host switches from the NVMe mode to the SD mode before maintenance operations being executed in the NVMe mode are complete, there may be reduced performance on the storage device as the maintenance operation may need to be completed in the foreground in the SD mode.

In a current approach where the storage device operates in universal flash storage (UFS) and NVMe modes, the host may enable/disable maintenance operations in the UFS mode, wherein the host may disable background operations when peak performance is needed and enable background operations when it provides power to the storage device and peak performance is not needed. The host may still not control (i.e., enable/disable) the background operations in the NVMe mode and may run non-optional background operations in the NVMe mode during idle periods, thus limiting the host power management capabilities.

SUMMARY OF THE INVENTION

In some implementations, the storage device may communicate with a host in multiple modes and physically erase data stored on a memory device in each mode. The storage device includes a memory device to store data. A controller on the storage device may receive a first command from the host to erase the data when the storage device communicates with the host in a first mode. The controller may execute the first command in the first mode and set an in-progress bit. The controller may determine when the storage device has switched to communicate with the host in a second mode and may determine that the in-progress bit is set. The controller may provide a first indication to the host, and in response to the first indication, receive a second command from the host, and execute the second command in the second mode. The second command erases the data in the second mode.

In some implementations, a method is provided on a storage device for physically erasing data on a storage device in communication with a host in multiple modes. The method includes receiving a first command from a host to erase data on a memory device when the storage device communicates with the host in a first mode. The method also includes executing the first command in the first mode and setting an in-progress bit. The method further includes determining that the storage device has switched to communicating with the host in a second mode and determining that the in-progress bit is set. The method includes providing a first indication to the host, receiving a second command from the host, and executing the second command in the second mode, wherein the second command erases the data in the second mode.

In some implementations, a storage device may also execute background operations according to instructions provided by the host. The controller may receive a control command to control background operations on the storage device from a host when the storage device communicates with the host in the first mode. The controller may execute the background operations according to the control command in the first mode. The controller may also determine that the storage device has switched to communicate with the host in the second mode and execute the background operations according to the control command in the second mode.

BRIEF DESCRIPTION OF THE DRAWINGS

FIG. 2 is an example flow diagram for executing a format command in a first mode and completing the format command when it is terminated before completion in a second mode in accordance with some implementations.

FIG. 3 is an example flow diagram for executing a sanitize command in a first mode and completing the sanitize command when it is terminated before completion in a second mode in accordance with some implementations.

FIG. 4 is an example flow diagram for controlling background operations on a storage device by a host that is communicating with the storage device in multiple modes in accordance with some implementations.

Figure 1:
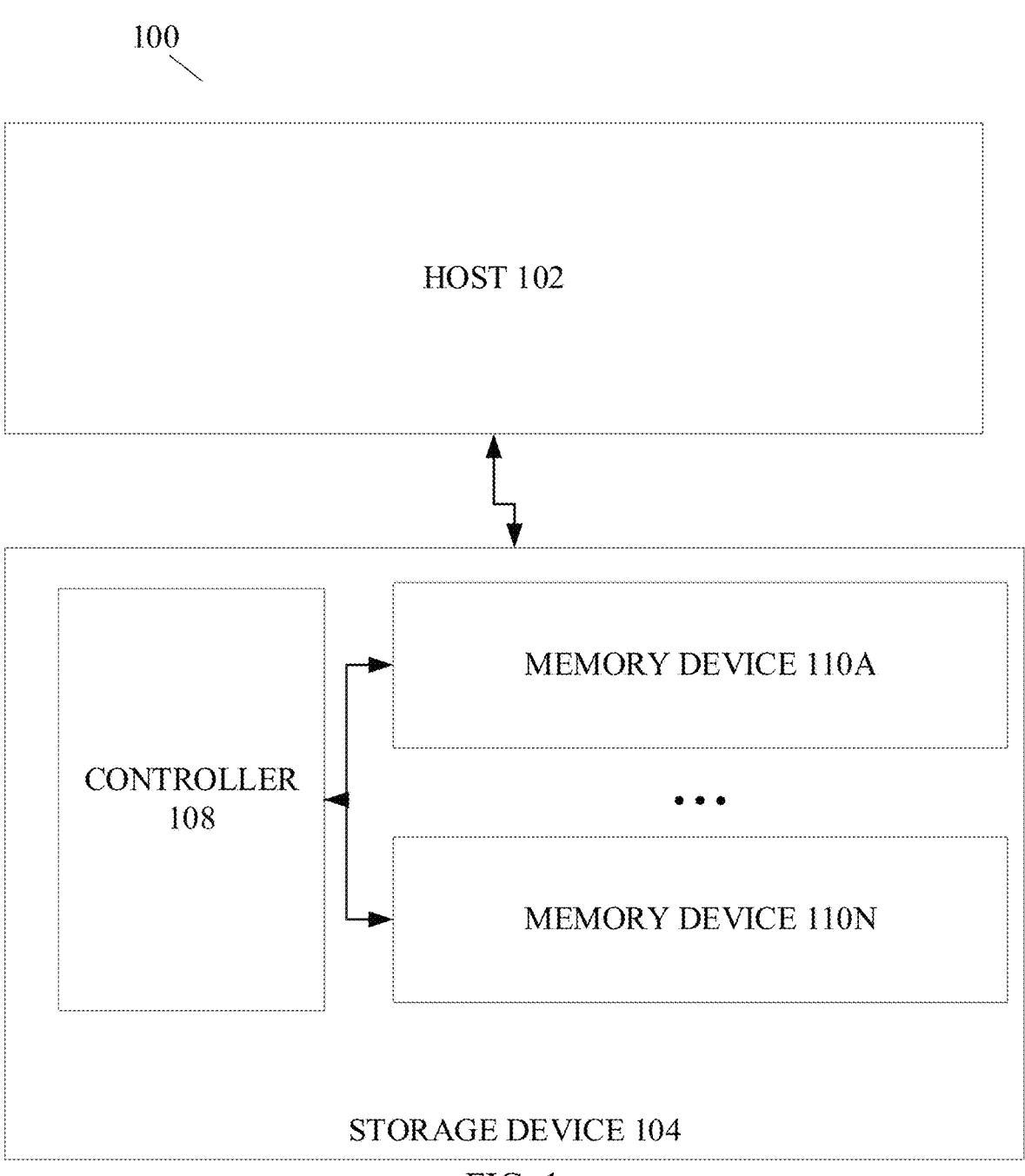
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity). Host 102 may communicate with storage device 104 in one or more modes. For example, host 102 and storage device 104 may communicate in a Non-Volatile Memory Express (NVMe) mode (referred to herein as a first mode) and/or a secure digital (SD) mode (referred to herein as a second mode).

Storage device 104 may include a controller 108 and one or more non-volatile memory devices 110a-110n (referred to herein as the memory device(s) 110). Storage device 104 may be, for example, a solid-state drive (SSD). Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory and/or a SD card that may be used for storing host and control data over the operational life of memory device 110. Memory device 110 may be included in storage device 104 or may be otherwise communicatively coupled to storage device 104.

When storage device 104 and host 102 communicate in the NVMe mode (i.e., the first mode), host 102 may send a format command (referred to herein as a first command or first format command) to storage device 104 to format memory device 110. Host 102 may use the first format command to change the attributes of memory device 110 (e.g., the logical-block address (LBA) data size and/or metadata size for a NVM Command Set). As part of the first format command, host 102 may select different LBA formats including, for example, 512 bytes (B), four KB, etc. Host 102 may also select different secure erase settings including, for example, a no-secure erase setting, a user data erase setting, and a cryptographic erase setting, and provide protection data information including, for example, protection information location, protection information, and metadata settings, for end-to-end protection.

During a format command operation, after controller 108 validates the first format command, controller 108 may mark format-in-progress variables for the format operation on memory device 110 and store the current format configurations on memory device 110. For example, controller 108 may set an in-progress bit (also referred to herein as a format-in-progress bit). As a block on memory device 110 is erased, controller 108 may keep track of the format-in-progress variables for the format operation. For example, controller 108 may keep track of the number of blocks formatted, the number of blocks remaining to be formatted, and which block is currently being formatted. When the format operation is successfully completed, controller 108 may clear the format-in-progress variables on memory device 110. If the format operation is terminated before completion, for example because of sudden power loss, the format-in-progress bit may remain set. If storage device 104 is restarted in the NVMe mode and the format-in-progress bit is set, host 102 may issue another format command (i.e., a second format command) to successfully complete the terminated format operation.

In cases where the format operation is terminated before successful completion (i.e., the format-in-progress bit is set) and host 102 connects with storage device 104 in the SD mode, at the end of an initialization sequence, controller 108 may validate the format-in-progress variables in memory device 110. If the format-in-progress bit is set, controller 108 may determine how the format operation may be continued. For example, controller 108 may determine that the format operation may be continued with a SD mode default LBA format setting, for example, 512 bytes. So, if, for example, host 102 issued the format command in NVMe mode with a 4 KB LBA format setting, controller 108 may determine that when memory device 110 is formatted in SD mode, controller 108 may ignore the 4 KB LBA format setting and continue formatting memory device 110 with a 512 bytes format setting. Controller 108 may also determine that the format operation may be continued with the host-configured secure erase settings provided in the NVMe mode and that the data protection information as provided in the NVMe mode, may be ignored.

After validating the formatting setting/parameters to be used in the SD mode, in the response to an initialization command, controller 108 may provide an indication to host 102 that the formatting needs to be completed in the SD mode. For example, controller 108 may set a format-required bit in the $40^{th}$ bit in the response of a command, for example, ACMD41. The format-required bit may be used to inform host 102 that a format operation is needed for controller 108 to clear memory device 110 to start input/output (I/O) operations. Based on the format-required bit setting, host 102 may provide a format command (referred to as the second command or second format command) in the SD mode. When host 102 provides the second format command in the SD mode, the blocks remaining to be formatted may be formatted according to the validated SD mode settings/parameters, without further host instructions.

Host 102 may also send a sanitize command (referred to herein as a first command or first sanitize command) to storage device 104 in the NVMe mode. Host 102 may select different sanitize erase settings including, for example, an exit failure mode, a start a block erase sanitize operation, a start an overwrite sanitize operation, or a start a cryptographic erase sanitize operation. During the sanitize operation, after controller 108 validates the first sanitize command, controller 108 may mark sanitize-in-progress variables for the sanitize operation on memory device 110 and store the current sanitize configurations on memory device 110. For example, controller 108 may set an in-progress bit (also referred to herein as a sanitize-in-progress bit). As a block is sanitized, controller 108 may keep track of the sanitize-in-progress variables. For example, controller 108 may keep track of the number of blocks sanitized, the number of blocks remaining to be sanitized, and which block is currently being sanitized. When the sanitize operation is successfully completed, controller 108 may clear the sanitize-in-progress variables on memory device 110, including the sanitize-in-progress bit. If the sanitize operation is terminated before completion, for example, because of sudden power loss, controller 108 may maintain the value of the sanitize-in-progress bit. If storage device 104 is restarted in the NVMe mode and the sanitize-in-progress bit is set, host 102 may issue another sanitize command (referred to herein as a second sanitize command) to successfully complete the terminated sanitize operations.

In cases where the sanitize operation is terminated before successful completion (i.e., the sanitize-in-progress bit is set) and host 102 connects with storage device 104 in the SD mode, at the end of an initialization sequence, controller 108 may check/validate the sanitize parameters provided by host 102. If the sanitize parameters is included in a first set of parameters including, for example, a start a block erase sanitize operation or start a cryptographic erase sanitize operation, controller 108 may indicate to host 102 that a format action is required by host 102 by, for example, setting the format-required bit in a response to an initialization command, for example, ACMD41. The format-required bit may be set, for example, in the $40^{th}$ bit in the response. Host 102 may issue a full-user-area physical erase (FUPE) command (referred to a third format command) to physically erase all blocks on memory device 110 so that controller 108 may continue the sanitize operation in SD mode.

If the sanitize parameters is included in a second set of parameters including, for example, an exit failure mode or a start an overwrite sanitize operation, controller 108 may need more data including, for example, deallocate after sanitize parameters, overwrite invert pattern between passes parameters, overwrite pass count parameters, etc., from host 102. Controller 108 may thus indicate to host 102 that a sanitize action is required by host 102 (i.e., send a second/sanitize indication) by setting the sanitize-required bit in the response to an initialization command, for example, ACMD41. The sanitize-required bit may be set, for example, in the $41^{th}$ bit in the response.

In some cases, when host 102 determines that the sanitize-required bit is set, host 102 may switch to the NVMe mode and execute a new sanitize command to complete the sanitize operation. In some cases, when host 102 sees the sanitize-required bit set, host 102 may issue the FUPE command to physically erase all blocks on memory device 110, thus ignoring all the half completed sanitize operations and its configurations.

The SD card may publish the FUPE feature by setting a bit in a command, for example, the $311^{th}$ bit of SD_STATUS as a response to ACMD13. The FUPE command may include, for example, CMD32 (indicating a start block), CMD33 (indicating an end block), and CMD38 (an erase command). A parameter associated with CMD38 may be set to one (representing a discard operation), two (representing a full-user-area logical erase (FULE) operation), three, (representing a FUPE user block erase operation), or a four (representing a cryptographic erase operation). On receiving the FUPE, controller 108 may start erasing user area blocks one by one. Host 102 may keep polling for FUPE progress status by sending CMD13. If other host commands are sent, they may fail while the format operation is in progress. While a FUPE operation is being carried out, controller 108 may provide a FUPE progress indication (FPI) through bits 0 and 1 of the card status, wherein 00 may indicate that less than 25% of the FUPE operation is complete, 01 may indicate that less than 50% of the FUPE operation is complete, 10 may indicate that less than 55% of the FUPE operation is complete, and 11 may indicate that less than 100% of the FUPE operation is complete. Until the FUPE operation is complete, a FUPE bit, for example, a currently reserved bit such as bit 7 of the card status, may be set to a value to indicate FUPE is in progress. Once all the user blocks are erased, the FUPE bit may be set to indicate that the FUPE is complete. Based on the FUPE operation, the blocks that were previously sanitized during the unsuccessful sanitize operation may also be erased. With the FUPE command, storage device 104 may therefore format/physically erase all the blocks on a SD card in SD mode without requiring host 102 to return to NVMe mode to format/physically erase all the blocks in memory device 110.

Host 102 may also enable/disable (i.e., control) background operations in each mode per its operating conditions. In NVMe mode, host 102 may send a vendor specific command to storage device 104 to enable/disable background operations on storage device 104. When the background operations are enabled, storage device 104 may process the background operations when it is idle (i.e., not processing host I/O operations). When the background operations are disabled, storage device 104 may postpone the background operation until a condition occurs on storage device. For example, storage device 104 may postpone the background operation until there is an urgent need (based, for example, on the condition of storage device 104 and/or memory device 110) to process the background operation. If a condition arises to process the background operations, storage device 104 may notify host 102 through an asynchronous event request as per specifications. After notifying host 102 of the urgent need for the background operations, host 102 may enable the background operations and provide power for storage device 104 to run the background operations until the urgent condition is addressed.

In SD mode, host 102 may send a command, (for example, GEN_CMD (CMD 56)) to storage device 104 to enable/disable background operations on storage device 104. When the background operations are enabled, storage device 104 may process the background operations in the foreground with host I/O operations, with possible reduced performance. When the background operations are disabled, storage device 104 may postpone the background operation until there is an urgent need (based, for example, on the condition of storage device 104 and/or memory device 110) to process the background operation. If an urgent need arises to process the background operations, storage device 104 may notify host 102 through an event indication method. In some cases, host 102 may provide sufficient time by providing power to run background operations until urgent conditions are addressed. Host 102 may expect peak performance during this period without any I/O throttling. In some cases, after receiving the notification of the urgent need for the background operations, host 102 may instruct storage device 104 to process the background operations in the foreground with host I/O operations until the urgent condition is addressed.

Host 102 may enable/disable background operations by assigning a control value and sending the control value to storage device 104. The control value may be a persistent value that may be retained across power cycles and mode switches. If host configures a background operations state as disabled in a first mode and switches to a second mode, controller 108 may, in the second mode, act per the stored control value. Allowing host 102 to control background operations may enable storage device 104 to postpone device management activities that may occur during peak periods to idle periods when host 102 is not using the storage device 104. Allowing host 102 to control background operations may also enable host 102 to control when storage device 104 uses power to perform management activities. As host 102 may have knowledge about the power consumed by storage device 104, host 102 may make the appropriate tradeoffs about when to use system power and when to conserve it.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIG. 2 is an example flow diagram for executing a format command in a first mode and completing the format command when it is terminated before completion in a second mode in accordance with some implementations. At 210, storage device 104 may receive a first format command to format memory device 110 while communicating with host 102 in a first mode. At 220, during a format command operation, after controller 108 validates the first format command, controller 108 may set format-in-progress variables including a format-in-progress bit for the format operation on memory device 110 and store the current format configurations on memory device 110. At 230, in cases where the format operation is terminated before successful completion and host 102 connects with storage device 104 in a second mode, controller 108 may validate the format-in-progress variables in memory device 110. At 240, controller 108 may provide an indication to host 102 that the formatting needs to be completed in the second mode. At 250, controller 108 may receive a second format command from host 102 in the second mode and format the blocks remaining to be formatted according to the validated settings in the second mode, without further host instructions. As indicated above FIG. 2 is provided as an example. Other examples may differ from what is described in FIG. 2.

FIG. 3 is an example flow diagram for executing a sanitize command in a first mode and completing the sanitize command when it is terminated before completion in a second mode in accordance with some implementations. At 310, storage device 104 may receive a first sanitize command to sanitize memory device 110 while communicating with host 102 in a first mode. At 320, during a sanitize command operation, after controller 108 validates the first sanitize command, controller 108 may set sanitize-in-progress variables including a sanitize-in-progress bit for the sanitize operation on memory device 110 and store the current sanitize configurations on memory device 110. At 330, in cases where the sanitize operation is terminated before successful completion and host 102 connects with storage device 104 in a second mode, controller 108 may check/validate the sanitize parameters provided by host 102. At 340, if the sanitize parameters are included in a first set of parameters, controller 108 may indicate to host 102 that a format action is required by host 102. At 350, controller 108 may receive a full-user-area physical erase (FUPE) command to physically erase all blocks on memory device 110 so that controller 108 may continue the sanitize operation in the second mode. At 360, if the sanitize parameters are included in a second set of parameters controller 108 may indicate to host 102 that a sanitize action is required and send a sanitize indication to host 102. At 370, controller 108 may receive a FUPE command to physically erase all blocks on memory device 110 or may be directed to return to the first mode so that the sanitize command may be completed in the first mode. As indicated above FIG. 3 is provided as an example. Other examples may differ from what is described in FIG. 3.

FIG. 4 is an example flow diagram for controlling background operations on a storage device by a host that is communicating with the storage device in multiple modes in accordance with some implementations. At 410, host 102 may also enable/disable (i.e., control) background operations in each mode per its operating conditions by setting a persistent control value. At 420, in a first mode, host 102 may send the control value as a vendor specific command to storage device 104 to enable/disable background operations on storage device 104, wherein when the background operations are enabled, storage device 104 may process the background operations when it is idle and when the background operations are disabled, storage device 104 may postpone the background operation until a condition occurs on storage device. At 430, if a condition arises to process the background operations when background operations are disabled in the first mode, storage device 104 may notify host 102 through an asynchronous event request as per specifications and host 102 may enable the background operations and provide power for storage device 104 to run the background operations until the urgent condition is addressed.

At 440, in a second mode, host 102 may send the control value as a command, to storage device 104 to enable/disable background operations on storage device 104, wherein when the background operations are enabled, storage device 104 may process the background operations in the foreground with host I/O operations and when the background operations are disabled, storage device 104 may postpone the background operation until there is an urgent need to process the background operation. At 450, if a condition arises to process the background operations when background operations are disabled in the second mode, storage device 104 may notify host 102 through an event indication method. At 460, host 102 may enable the background operations and provide sufficient time by providing power to run background operations until urgent conditions are addressed or host 102 may instruct storage device 104 to process the background operations in the foreground with host I/O operations until the urgent condition is addressed. As indicated above FIG. 4 is provided as an example. Other examples may differ from what is described in FIG. 4.

Figure 5:
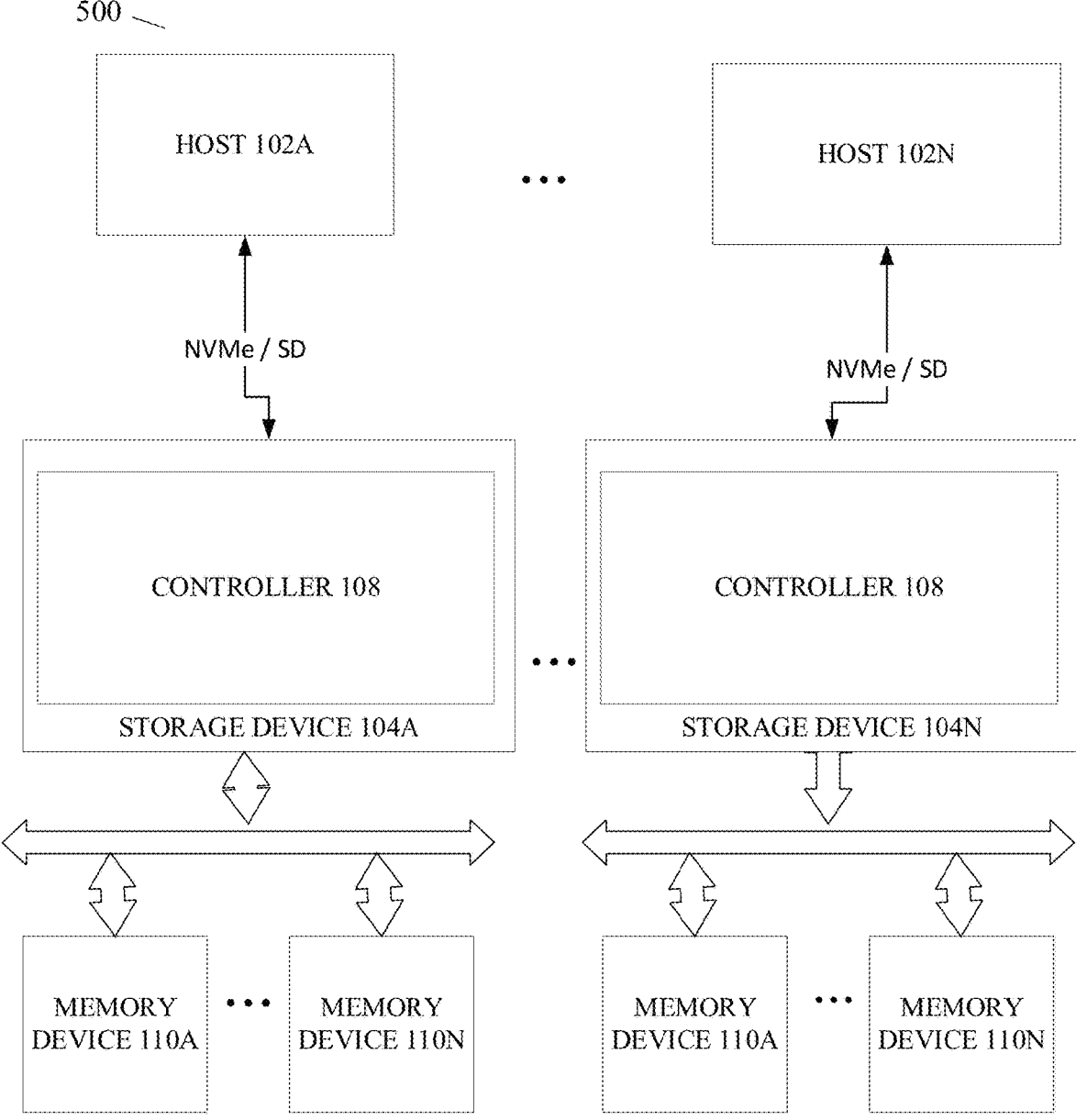
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Storage device 104 may include a controller 108 to process instructions such as format, sanitize in multiple modes, and/or instructions for controlling operations of background operations in multiple modes. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

Figure 6:
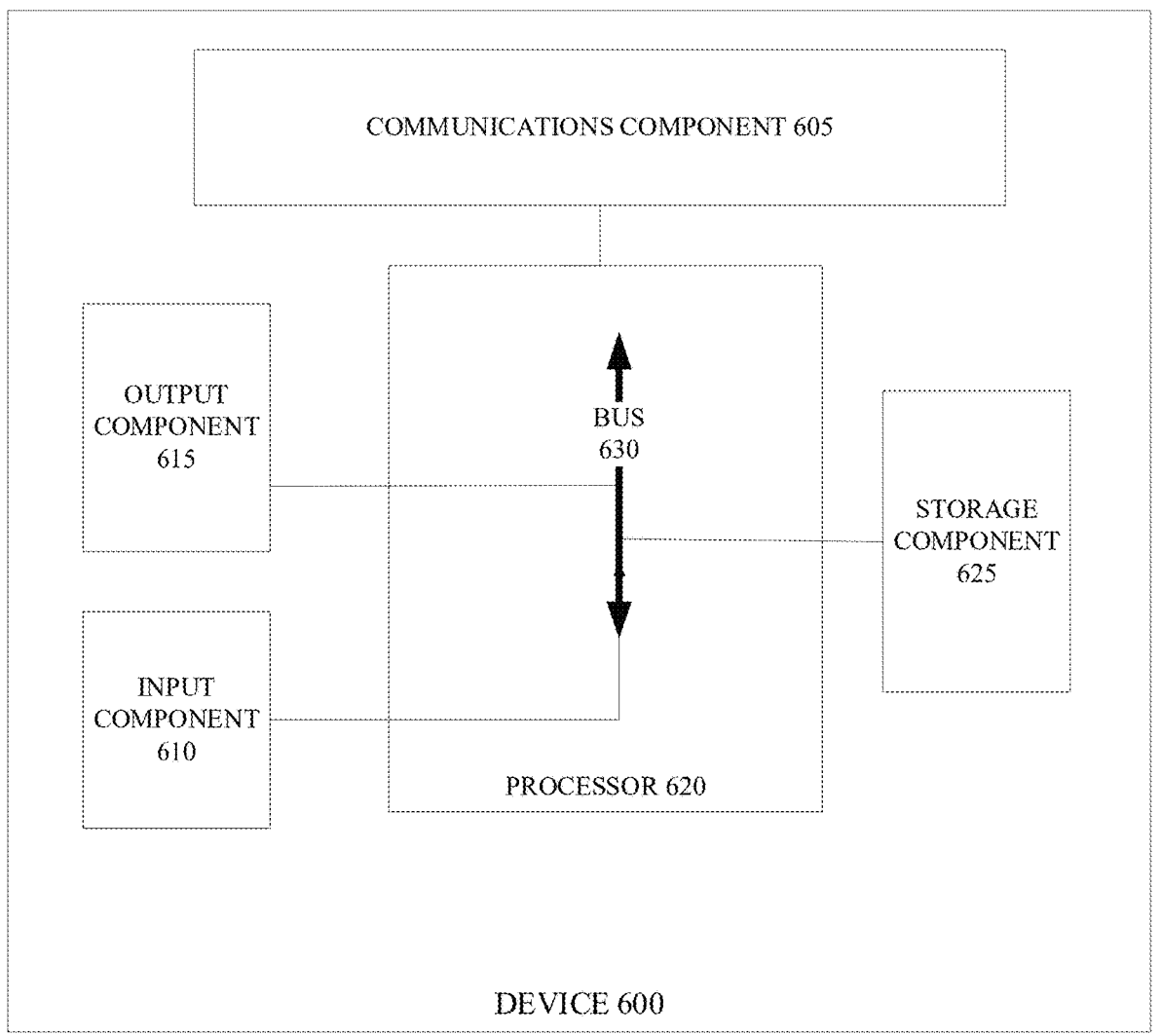
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM), read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device to communicate with a host in multiple modes and to physically erase data stored on a memory device in multiple mode, the storage device comprises:

a memory device to store data; and a controller to receive a first command from a host to erase the data when the storage device communicates with the host in a first mode, execute the first command in the first mode, set an in-progress bit, determine when the storage device has switched to communicate with the host in a second mode, determine that the in-progress bit is set, provide a first indication to the host, receive a second command from the host, and execute the second command in the second mode, wherein the second command erases the data in the second mode.

2. The storage device of claim 1, wherein the first command is one of a sanitize command and a format command, and the controller maintains a value of the in-progress bit when an operation to execute the first command terminates before successful completion and clears the value of the in-progress bit when the operation to execute the first command successful complete.

3. The storage device of claim 1, wherein the first command is a first format command and the second command is a second format command, and when in the second mode, the controller validates in-progress variables, receives the second format command from the host in response to the first indication, and executes the second format command according to validated parameters in the second mode.

4. The storage device of claim 1, wherein the first command is a sanitize command and the second command is a third format command, and when in the second mode, the controller evaluates a sanitize parameter and determines if the sanitize parameter is in a first set of sanitize parameters, in response to the first indication, receives the third format command from the host, and executes the third format command according to the sanitize parameter.

5. The storage device of claim 4, wherein the third format command is a full-user-area physical erase (FUPE) command to physically erase blocks on the memory device.

6. The storage device of claim 1, wherein the first command a sanitize command and the second command is a third format command, and when in the second mode, the controller evaluates a sanitize parameter and determines if the sanitize parameter is in a second set of sanitize parameters, sends a second indication to the host, and in response to the second indication, receives the third format command from the host and executes the third format command according to the sanitize parameter.

7. The storage device of claim 6, wherein the second indication is a sanitize action indication and the third format command is a FUPE command to physically erase blocks on the memory device.

8. The storage device of claim 1, wherein the storage device publishes a FUPE command to physically erase blocks on the memory device in the second mode, the FUPE command including an indication of a start block, and indication of an end block and an erase command including a parameter to perform a full-user-area physical erase operation.

9. The storage device of claim 8, wherein the controller provides a progress indication for a FUPE operation and sets a FUPE bit when the FUPE operation completes.

10. A method for physically erasing data on a storage device in communications with a host in multiple modes, the storage device comprises a controller to execute the method comprising:

receiving a first command from a host to erase data on a memory device when the storage device communicates with the host in a first mode;

executing the first command in the first mode;

setting an in-progress bit;

determining when the storage device has switched to communicating with the host in a second mode and determining that the in-progress bit is set;

providing a first indication to the host;

receiving a second command from the host; and executing the second command in the second mode, wherein the second command erases the data in the second mode.

11. The method of claim 10, further comprising maintaining a value of the in-progress bit when an operation to execute the first command terminates before successful completion and clearing the value of the in-progress bit when the operation to execute the first command successful complete.

12. The method of claim 10, wherein the first command is a first format command and the second command is a second format command, and when in the second mode, the method comprises validating in-progress variables, receiving the second format command from the host in response to the first indication, and executing the second format command according to validated parameters in the second mode.

13. The method of claim 10, wherein the first command is a sanitize command and the second command is a third format command, and when in the second mode, the method comprises evaluating a sanitize parameter, determining if the sanitize parameter is in a first set of sanitize parameters, and in response to the first indication, receiving the third format command from the host, and executing the third format command according to the sanitize parameter.

14. The method of claim 10, wherein the first command a sanitize command and the second command is a third format command, and when in the second mode the method comprises evaluating a sanitize parameter, determining if the sanitize parameter is in a second set of sanitize parameters, sending a second indication to the host, and in response to the second indication, receiving the third format command from the host and executing the third format command according to the sanitize parameter.

15. The method of claim 10, further comprising publishing a full-user-area physical erase (FUPE) command to physically erase blocks on the memory device in the second mode, the FUPE command including an indication of a start block, and indication of an end block and an erase command including a parameter to perform a full-user-area physical erase operation.

16. The method of claim 15, further comprising providing a progress indication for a FUPE operation and setting a FUPE bit when the FUPE operation completes.

17. A storage device to communicate with a host in multiple modes and to execute background operations according to instructions provided by the host, the storage device comprises:

a memory device to store data; and a controller to receive a control command to control background operations on the storage device from a host when the storage device communicates with the host in a first mode, execute the background operations according to a value of the control command in the first mode, determine that the storage device has switched to communicating with the host in a second mode, and execute the background operations according to the value of the control command in the second mode.

18. The storage device of claim 17, wherein when the background operations are enabled in the first mode, the controller processes the background operations when it is not processing host input/output instructions and when the background operations are disabled in the first mode, the controller postpones the background operations until a control command to execute the background operations is received from the host.

19. The storage device of claim 17, wherein when the background operations are enabled in the second mode, the controller processes the background operations when it is processing host input/output instructions and when the background operations are disabled in the second mode, the controller postpones the background operations until a control command to execute the background operations is received from the host.

20. The storage device of claim 17, wherein when the background operations are disabled and a condition arises for background operations to be executed the controller sends an indication to the host.

* * * * *